UNITED STATES PATENT OFFICE.

ANTON MESSERSCHMITT, OF STOLBERG, GERMANY.

NITRATE FERTILIZER AND PROCESS OF MAKING THE SAME.

1,135,387.  Specification of Letters Patent.  Patented Apr. 13, 1915.

No Drawing.  Application filed October 5, 1912. Serial No. 724,198.

*To all whom it may concern:*

Be it known that I, ANTON MESSERSCHMITT, doctor of philosophy, a subject of the Emperor of Germany, and a resident of the city of Stolberg, in Rhine Province, Germany, have invented certain new and useful Improvements in Nitrate Fertilizers and Processes of Making the Same, of which the following is a full, clear, and exact description.

My invention consists generally in producing a fertilizer of high degree of efficiency by decomposing rock containing potassium compounds with calcium compounds, such as lime, which is preferably done by finely grinding the lime and thoroughly mixing it with the rock and heating. The product thus obtained contains the larger part of the alkalis in a form in which they are soluble in water. I have further discovered that for obtaining the results of my new process, it is not necessary to convert these alkalis into a form in which they are soluble in water, for when using a very slight amount of lime, bisilicates are produced which are soluble in acids and from which alkali compounds are not obtained by treatment with water and that these bisilicates are well suited for use in my process. The production of these bisilicates and their use in my process for the production of fertilizers possess great economical and commercial value, as only a small amount of lime is used; the amount of material to be heated is considerably reduced, and rocks whose potassium compound content is small can be successfully employed by my process, whereas their use would be prohibitive in the processes now known as the potassium content of the produced product is so small as to make it of no commercial value as a fertilizer ingredient. If the product thus obtained is treated with wet nitrous gases, the said gases are at once rapidly absorbed; or bricks formed from the decomposed mixture of rocks and calcium compounds may be thoroughly moistened with water before the introduction of the nitrous gases. Apart from the above-mentioned methods, other methods may be used in a similar way, which have been suggested for the manufacture of nitrates and nitrites by treatment of lime.

While the nitrous gases may be introduced until complete saturation is effected, it is preferable to proceed only to the point where all of the potassium compounds and the larger part of the lime are transformed into nitrate.

As a result of this process the fertilizer still contains insoluble double silicate as well as the silicic acid in the form of aluminium silicates. These silicates honeycomb the product, render it less hygroscopic than calcium nitrates and prevent it from caking together, which is extremely important in the practical handling of this product.

The process is best conducted practically by passing the product resulting from the heating of the rock and calcium compound, finely ground, into a rotating cylinder in which the products pass in a direction opposite to that of the nitrous gases. The nitrate fertilizer which is thus obtained has a high degree of efficiency, as it contains not only all of the potassium compounds of the rock but also the silicic acid in a form which is rendered soluble by plants.

Having thus described my invention, what I claim is:

1. The herein described process of producing a soluble nitrate fertilizer containing a potassium compound and silicic acid, which comprises decomposing a rock containing potassium compounds with a calcium compound to form bisilicates and treating the resultant product with nitrous gases in the presence of water to form nitrates.

2. The herein described process of producing a soluble nitrate fertilizer containing a potassium compound and silicic acid, which comprises decomposing a rock containing potassium compounds with lime and treating the resultant product with nitrous gases in the presence of water to form nitrates.

3. The herein described process of producing a soluble nitrate fertilizer containing a potassium compound and silicic acid, which comprises decomposing a rock containing potassium compounds with calcium carbonate by means of heat and treating the resultant product with nitrous gases in the presence of water to form nitrates.

4. The herein described process of producing a soluble nitrate fertilizer containing a potassium compound and silicic acid, which comprises decomposing a rock containing potassium compounds by means of heat with calcium carbonate sufficient to produce alkali-metal bisilicates and treating the resultant product with nitrous gases in the presence of water to form nitrates.

5. The herein described process of producing a soluble nitrate fertilizer containing a potassium compound and silicic acid, which comprises decomposing a rock containing potassium compounds with a calcium compound to form bisilicates, treating the resultant product with nitrous gases in the presence of water to form nitrates, and interrupting the process before all the basic compounds are transformed into nitrates.

6. The herein described process of producing a soluble nitrate fertilizer containing a potassium compound and silicic acid, which comprises decomposing a rock containing potassium compounds with a reactive calcium compound sufficient to produce an alkali-metal bisilicate, treating the said alkali-metal bisilicate with nitrous gases in the presence of water to form nitrates and interrupting the process before all the basic compounds are transformed into nitrates.

7. The herein described fertilizer containing potassium nitrate, calcium nitrate, aluminium nitrate and silicic acid.

8. The herein described fertilizer containing potassium nitrate, calcium nitrate, aluminium nitrate, bisilicates, and silicic acid.

In testimony whereof I affix my signature in presence of two witnesses.

ANTON MESSERSCHMITT.

Witnesses:
ALBERT T. OTTO,
HENRY QUADFLIEG.